DOUBLE PUMPED FERROMAGNETIC MICROWAVE AMPLIFIER

Filed Sept. 24, 1965 2 Sheets-Sheet 1

INVENTORS
Edward T. Hooper, Jr.
Albert D. Krall
BY
ATTORNEY
AGENT

Jan. 17, 1967 E. T. HOOPER, JR., ETAL 3,299,365

DOUBLE PUMPED FERROMAGNETIC MICROWAVE AMPLIFIER

Filed Sept. 24, 1965 2 Sheets-Sheet 2

INVENTORS
Edward T. Hooper, Jr.
Albert D. Krall

BY

ATTORNEY

AGENT

United States Patent Office 3,299,365

Patented Jan. 17, 1967

3,299,365
DOUBLE PUMPED FERROMAGNETIC MICROWAVE AMPLIFIER

Edward T. Hooper, Jr., Silver Spring, and Albert D. Krall, Rockville, Md., assignors to the United States of America as represented by the Secretary of the Navy Filed Sept. 24, 1965, Ser. No. 490,144
9 Claims. (Cl. 330—4.8)

The invention described herein may be manufactured and used by or for the Government of the United States of America for governmental purposes without the payment of any royalties thereon or therefor.

This invention relates to ferromagnetic microwave amplifiers and more particularly to double pumping microwave amplifiers employing ferromagnetic nonlinear media for improving the gain-band width performance.

A ferromagnetic microwave amplifier is a low noise signal amplifier which is used to amplify a weak input signal. Generally, the amplification is provided by utilizing the nonlinear property of the magnetization of ferromagnetic materials such as crystal yttrium iron garnet. Ferromagnetic crystals have several magnetostatic modes which can be excited by an applied D.C. magnetic field to provide necessary resonances in the nonlinear reactance of the ferromagnetic material; so that, when properly biased, the crystals will act as resonant circuits to applied microwave signals at particular frequencies. When the ferromagnetic material is pumped with energy from an energy source at the appropriate frequency there is a large buildup of power at the signal frequency which results in amplification of microwave signals.

In the past either crystal yttrium iron garnet has been pumped from a single low power energy source while the microwave field and the D.C. field are parallel, or other ferromagnetic materials have been pumped with high power microwaves applied at right angles to the D.C. magnetic field. These ferromagnetic amplifiers, while satisfactory in some instances, have been found to have definite limitations in several applications inasmuch as the latter methods require high power pumping sources and the former has thus far been restricted in bandwidth.

The present invention is a broad banding technique for utilizing low power pump supplies with ferromagnetic material which employs the method of pumping the ferrite material with two independent pump frequencies either from two separate pump sources or by psuedo-double pumping with a single pump source. A relatively large gain-bandwidth product with low noise figures is obtained by pumping yttrium iron garnet with two pump frequencies from low power pump sources although the use of other ferromagnetic materials are within the scope of this invention.

An object therefore is to provide low power pumping means to a narrow bandwith microwave amplifier.

Another object is to provide a ferromagnetic microwave amplifier having increased bandwidth and gain level with a reduction in noise factor, and an increase in stability of the amplified signal.

Yet another object is the provision of a microwave amplifier having broad input bandwidth and an output consisting of an array of frequencies for a single frequency input.

A further object is to provide a method of applying double pumping to a microwave amplifier which employs ferromagnetic nonlinear media.

Still another object is the provision of a ferromagnetic amplifier which is pumped with two pump frequencies from two pump sources.

Yet another object is to provide ferromagnetic amplifier for amplifying microwave signals having a single pump source which modulates the ferrite material with two pump frequencies.

Other objects and features of the invention will become apparent to those skilled in the art as the disclosure is made in the following description of an embodiment of the invention as illustrated in the accompanying sheets of drawings in which.

Figure 1:
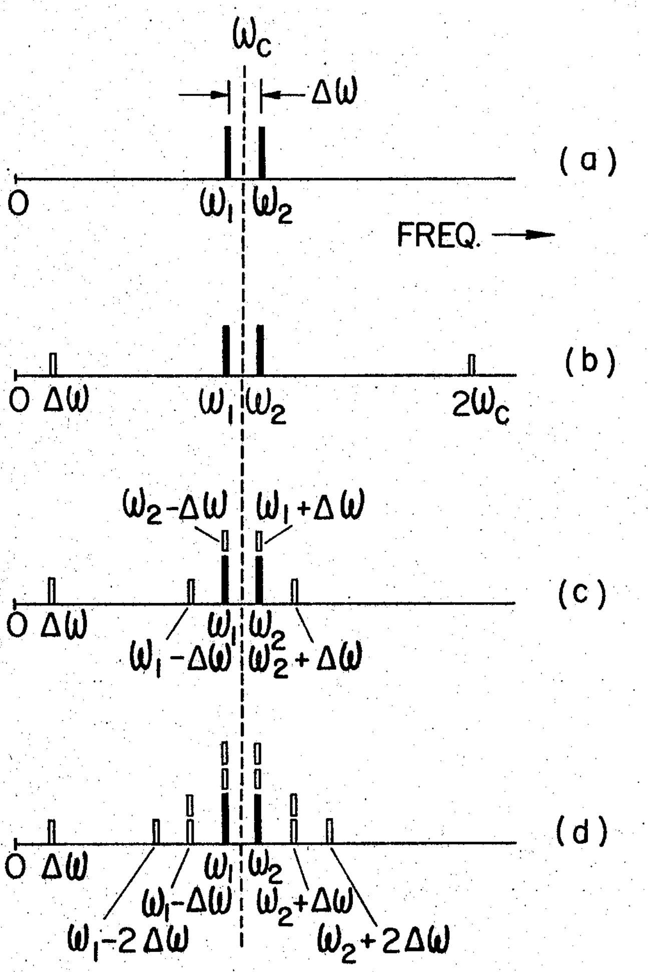
FIG. 1 illustrates the double pumping action of two pump frequencies.

Double pumping of a ferromagnetic nonlinear amplifier is best illustrated in FIG. 1. In FIG. 1*a* two pump frequencies $\omega_1$ and $\omega_2$ separated by variable amount are mixed in a nonlinear, reactance centered about resonant frequency $\omega_c$. The frequencies $\omega_1$ and $\omega_2$ are in the microwave range but the separation $\Delta\omega$ may be a few hundred kilocycles. Each pump frequency $\omega_1$ and $\omega_2$ is equal to the sum of the frequencies of certain pairs of modes in the nonlinear reactance and can each transfer a finite real power to the modes once a pair of modes and their corresponding pump frequency have been chosen. The action of the double frequency pumping and the nonlinear media produces modulation products $2\omega_c$ and $\Delta\omega$ as the sum and difference frequencies respectively as shown in FIG. 1*b*. The difference frequency $\Delta\omega$ in the nonlinear media remodulates the two pumps producing upper and lower sidebands centered around each pump frequency giving frequencies $\omega_2\pm\Delta\omega$ and $\omega_1\pm\Delta\omega$ as shown in FIG. 1*c*. These new frequencies then appear as new pump frequencies which are in turn modulated by frequency difference $\Delta\omega$ giving upper and lower sidebands $\omega_2\pm2\Delta\omega$ and $\omega_1\pm2\Delta\omega$ as shown in FIG. 1*d*. These sidebands contain relatively large amounts of power and continue to add to the original power until the power present in the newly created pump frequencies falls below that power necessary for pumping action.

In effect therefore there exists an array of pump frequencies spaced $\Delta\omega$ apart extending up to a point where the power at a given frequency ceases to be effective in pumping which act upon an incoming signal producing an array of idler frequencies which in turn produce an array of signal frequencies. The final result, therefore, is that the input bandwidth is broadened by the mechanism described with an output consisting of an array of frequencies for a single frequency input.

Figure 3:
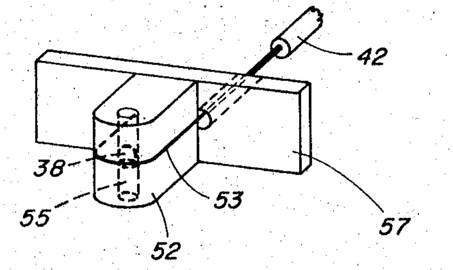
FIG. 3 is an enlarged isometric view of the ferromagnetic sphere and housing of the embodiment of FIG. 2.
Figure 2:
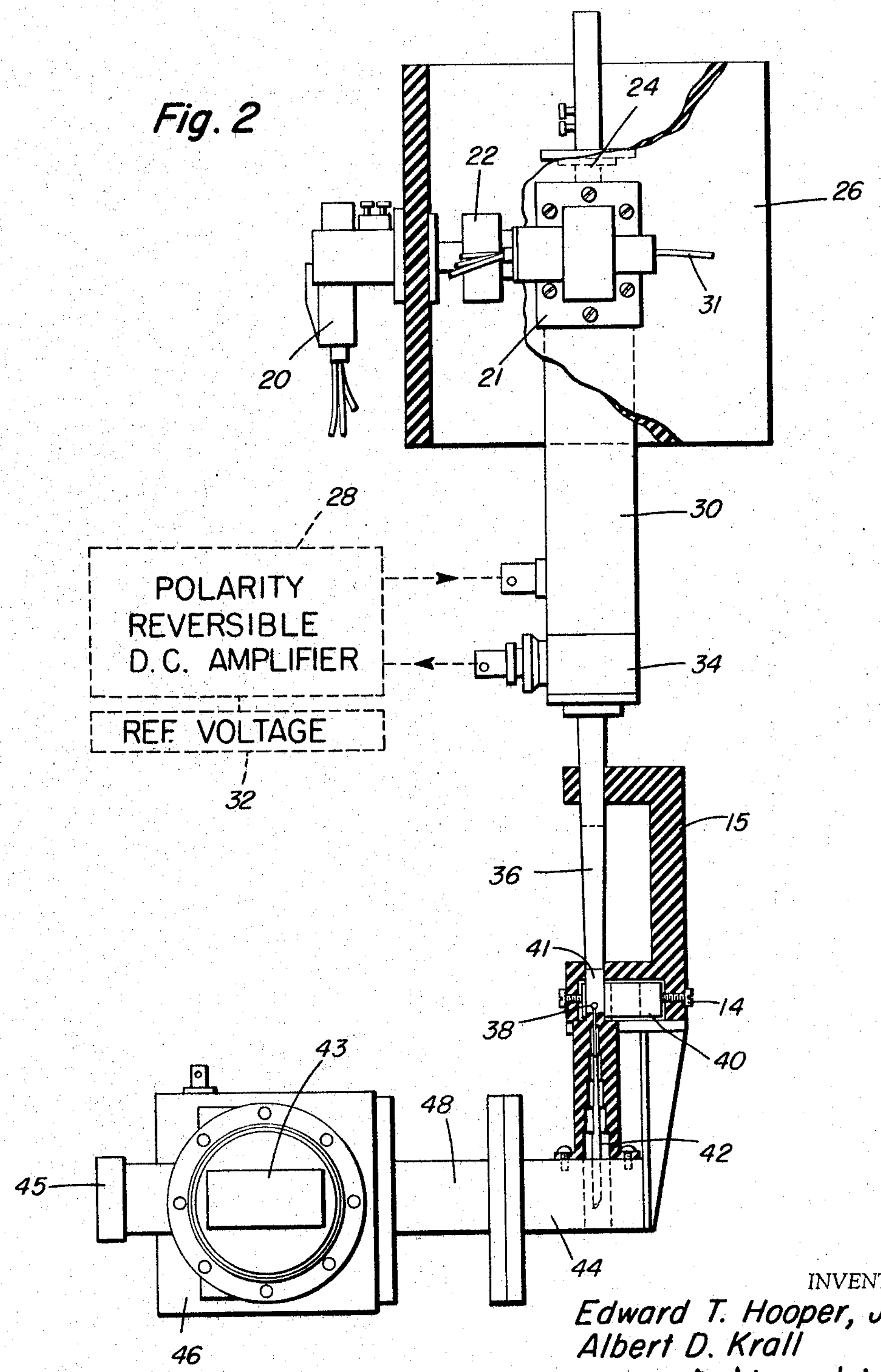
FIG. 2 illustrates one embodiment of the invention.

FIGS. 2 and 3 illustrate one embodiment which has been satisfactory in providing two pump frequencies to a nonlinear ferromagnetic media for amplification of microwave signals. Two pump klystrons 20 and 21 are coupled to a heat sink 26, which may be aluminum or the like material, and are connected by ferrite isolators, such as isolater 22, by well known wave guide methods to a magic tee 24. The magic tee 24 couples the pumping signals through the electrically variable ferrite attenuator waveguide 30 to a dielectric loaded tapered waveguide 36 to the ferromagnetic crystal 38.

Power monitor 34 monitors the pump power and compares it with a reference voltage 32 through polarity reversible D.C. amplifier 28 which feeds any error detected into the variable attenuator 30. Ferrite attenuator 30 is constructed to reduce any error detected thereby maintaining constant pump power to the ferromagnetic sphere 38.

A yttrium iron garnet sphere 38 is housed in a dielectric loaded cavity 41 which is coupled to the dielectric loaded taper 36. The cavity 41 although not necessary for the operation of the invention is useful in increasing the magnitude of the pump field.

A magnet 40 is held in place in housing 15 by set screws 14 which enable the magnet to be varied for adjusting the required D.C. field across the ferrite sphere. Extending up into resonant cavity 41 coaxial cable 42 serves to couple input signals and output signals respectively to and from the sphere 38 from and to waveguide signal line 44.

A conventional wave guide circulator 46 is coupled to signal line 44 by filter and tuner 48. The circulator 46 is a four port device with port 43 for example being an input signal port and port 45 being a load dummy. The output port (not shown) is located 180 degrees from input port 43.

The yttrium iron garnet sphere 38 is highly polished and has a line width equal to approximately 0.5 gauss. To reduce variations in crystalline anistropy due to temperature changes the sphere is oriented and mounted on a cylindrical post 55. The sphere 38 is oriented so that a {110} crystalline plane is arranged to be parallel with the D.C. magnetic field. The [100] crystalline axis is aligned at an angle approximately 30° from the field. The sphere 38 and post 55 are positioned in a dielectric spacer 52 which is attached to the back wall 57 of the cavity 41. This spacer 52 holds sphere 38 a short distance from the back wall 57 and provides a contour for coupling loop 53 which is soldered to the back wall to partially encircle the garnet sphere 38.

When a signal to be amplified is received over coaxial cable 42 the two pump frequencies set up resonance modes for both the idler and the signal frequencies. By proper adjustment of the filter and tuner 48 the signal frequency may be reflected back over loop 53 except amplified by a large amount. The individual pumps, as stated before, modulate and produce an array of pump frequencies which transfer energy to the signal and idler by way of the regenerative process producing the broad band signal and idler modes. A display of signal output for sweep signal input shows approximately equally strong amplification around the signal and idler frequencies. With proper pump spacing of $\Delta\omega$ the peaks of the output will blend into a smooth curve with a wideband and a high gain.

A single pump klystron is sufficient for producing double pumping action if one of the klystrons is removed and a modulating signal is applied to the remaining klystron. If, for example, klystron 20 is removed and a square wave signal is applied to lead 31, approximately the same results are obtained as with two pumps. This has produced the effect of psuedo-double-pumping by providing some modulation of the klystron itself giving two separated frequencies which then modulate the garnet sphere 38 is the manner aforediscussed.

Although a magic tee has been shown as a means of coupling the two pumps into a common line, several other conventional microwave coupling means could obviously be used. For example, the two pumps can be combined into a common feed by means of a diplexer, a magnetic coupler, or a sidewall coupler. Also the individual pumps could be applied directly through separate ports to the resonant cavity 41. As mentioned before, the use of yttrium iron garnet for the modulation in the nonlinear media is not essential since any ferromagnetic material which allows the pump frequencies to interact in the material is suitable.

From the foregoing, it is apparent that a method and means for doing so have been found for applying double pumping to a ferromagnetic amplifier to achieve an increased gain bandwidth product, accompanied with a reduction in noise factor and an increase in stability.

Obviously many modifications and variations of the present invention are possible in the light of the above teachings. It is therefore to be understood, that within the scope of the appended claims, the invention may be practiced otherwise than as specifically described.

What is claimed is:

1. A ferromagnetic microwave amplifier comprising:
a ferromagnetic nonlinear reactance having a plurality of resonance modes, at least one of said modes being resonant to an idler frequency and one of said modes resonant to a signal frequency,
a magnet positioned in the vicinity of said reactance for coupling a D.C. magnetic field into said reactance,
input-output means coupled to said reactance for applying microwave signals having frequencies within a predetermined range into said reactance and for reflecting an amplified output signal from one of said resonance modes,
and means coupled to said reactance for pumping said reactance at first and second frequencies which are respectively equal to the sum of an idler frequency and first and second signal frequencies within said predetermined range.

2. The apparatus of claim 1 wherein said nonlinear reactance is a highly polished yttrium iron garnet sphere.

3. The apparatus of claim 2 further comprising microwave coupling means between said pumping means and said nonlinear reactance arranged to couple a pumping energy field into said reactance in parallel with said D.C. magnetic field.

4. The apparatus of claim 1 where said input-output means comprises a circulator, filter and tuner means coupled to said circulator, a micro wave signal line coupled to said filter and tuner means, and a coaxial cable coupled between said signal line and said nonlinear reactance.

5. The apparatus of claim 1 wherein said pumping means is a first pump source and a second pump source.

6. The apparatus of claim 1 wherein said pumping means is a single pump source modulated by a square wave, said pump source having upper and lower modulated sideband output frequencies which are respectively said first and second pumping frequencies.

7. The apparatus of claim 6 wherein said nonlinear reactance is a highly polished yttrium iron garnet sphere.

8. The apparatus of claim 4 wherein said pumping means is a first pumping source and a second pumping source.

9. A ferromagnetic microwave amplifier comprising:
a yttrium iron garnet crystal sphere having a plurality of resonance modes, one of said modes being resonant to an idler frequency and one of said modes being resonant to a predetermined signal frequency within a predetermined frequency range,
a magnet positioned in the proximity of said sphere for coupling a direct current magnetic field into one plane of said sphere,
a microwave circulator having an input port and an output port,
filter and tuner means coupled to said circulator,
a microwave signal line coupled to said filter and tuner means,
a coaxial cable having a thin wire loop coupled between said signal line and said yttrium iron garnet sphere,
a first pump klystron and a second pump klystron,
wave guide coupling means connected between said first and second klystrons for coupling pump power at first and second frequencies having microwave fields applied in parallel to said D.C. magnetic field providing an array of pump frequencies in said sphere, whereby a signal having a frequency within said range is applied to the circulator input and an amplified output signal of the same frequency is produced at the circulator output.

References Cited by the Examiner

UNITED STATES PATENTS

| | | | |
|---|---|---|---|
| 3,018,443 | 1/1962 | Bloom et al. | 330—4.9 |
| 3,130,322 | 4/1964 | Spacek | 330—4.9 |

OTHER REFERENCES

Spacek: "Proc. IRE," June 1962, pp. 1534–1535.

Clark et al.: "Proc. IRE," November 1962, pp. 2378–2380.

Quantum Electronics: Edited by Townes, Columbia University Press, New York, 1960, pp. 306–313.

ROY LAKE, *Primary Examiner.*

D. HOSTETTER, *Assistant Examiner.*